United States Patent [19]

Shindou et al.

[11] Patent Number: 5,102,746
[45] Date of Patent: Apr. 7, 1992

[54] MULTICOATED STEEL SHEET SUSCEPTIBLE TO CATIONIC ELECTRODEPOSITION COATING

[75] Inventors: Yoshio Shindou; Motoo Kabeya, both of Kimitsu, Japan

[73] Assignee: Nippon Steel Corporation, Tokyo, Japan

[21] Appl. No.: 78,622

[22] Filed: Jul. 28, 1987

[30] Foreign Application Priority Data

Jul. 31, 1986 [JP] Japan .................. 61-180943

[51] Int. Cl.$^5$ .............................. B32B 15/04
[52] U.S. Cl. ........................ 428/623; 428/626; 428/659; 427/386; 427/388.1
[58] Field of Search ........... 428/623, 624, 626, 653, 428/659; 204/38.7; 427/386, 388.1

[56] References Cited

U.S. PATENT DOCUMENTS

| 4,659,394 | 4/1987 | Hara et al. | 428/623 |
| 4,775,600 | 10/1988 | Adaniya et al. | 428/626 |

FOREIGN PATENT DOCUMENTS

| 45-24230 | 8/1970 | Japan . |
| 47-6882 | 2/1972 | Japan . |
| 51-79138 | 7/1976 | Japan . |
| 52-44569 | 11/1977 | Japan . |
| 58-19706 | 4/1983 | Japan . |
| 58-138758 | 8/1983 | Japan . |
| 58-224174 | 12/1983 | Japan . |
| 60-33192 | 2/1985 | Japan . |
| 60-174879 | 9/1985 | Japan . |

*Primary Examiner*—R. Dean
*Assistant Examiner*—George Wyszomierski
*Attorney, Agent, or Firm*—Pollock, Vande Sande & Priddy

[57] ABSTRACT

This invention provides an organic multicoated steel sheet susceptible to cationic electrodeposition coating which comprises a zinc or zinc alloy plated steel sheet and as a first layer provided on the surface of said plated steel sheet a sparely soluble chromate film of 1–30% in water soluble matter, 0.01–1.0 in $Cr^{6+}/Cr^{3+}$ ratio and 10–150 mg/m$^2$ in total chromium application amount on one surface and as a second layer provided said first layer a solid film having a thickness of 0.3–5 μm of a solvent type coating composition having the following composition based on the weight of non-volatile matter:
(a) 30–90% of an urethanated epoxy ester resin having a number-average molecular weight of 300–100,000,
(b) 5–40% of a hydrophilic polyamide resin having a polymerization degree of 50–1,000
(c) 5–40% of a silica particle of 1–100 mμ in average particle size and
(d) 1–20% of a polyethylene wax having a molecular weight of 1,000–10,000.

10 Claims, No Drawings

MULTICOATED STEEL SHEET SUSCEPTIBLE TO CATIONIC ELECTRODEPOSITION COATING

BACKGROUND OF THE INVENTION

1. Field of the Invention

This invention relates to a steel sheet plated with Zn, Zn alloy such as Zn-Ni, Zn-Fe, Zn-Mg, Zn-Al, or the like, Al or with multi-layers of these metals which is excellent in cationic electrodeposition coating properties, press workability and corrosion resistance and which is also weldable.

2. Description of Prior Art

Recently, organic thin film multicoated steel sheets of less than 10 μm thick have been increasingly used for improvement of productivity in the car industry, the appliance industry, etc. On the other hand, in order to meet the demand, various organic multicoated steel sheets and coating compositions have been developed in the steel industry and the paint industry. However, the conventional coating compositions have not sufficiently met the various quality requirements for organic multicoated steel sheets, for example, those in press working, electrodeposition, spot welding, etc.

That is, the zinc-rich coating compositions proposed in Japanese Patent KOKOKU (Post-Exam. Publn.) Nos. 24230/70 and 6882/72 can be electrodeposited, but are still insufficient in press workability, corrosion resistance and weldability. Furthermore, the coating compositions containing conductive pigment proposed in Japanese Patent KOKOKU (Post-Exam. Publn.) Nos. 44569/77 and 19706/83 and Japanese Patent KOKAI (Laid-Open) Nos. 138758/83 and 79138/76 have remarkably improved corrosion resistance in zinc-plated steel sheets and further improved weldability, but since they contain relatively large particle pigments such as zinc dust, metallic powder, metallic carbide, metallic phosphide, etc., the electrodeposited film is very irregular and lacks smoothness and the sheets are poor in press moldability and are limited in positions for use.

Furthermore, coating compositions containing no conductive pigment and capable of being electrodeposited in the form of thin film of 0.3-3 μm are proposed in Japanese Patent KOKAI (Laid-Open) Nos. 33192/85, 224174/83 and 174879/85. Although organic composite silicate films formed therefrom and steel sheets coated therewith are improved in corrosion resistance, weldability and press moldability, they still suffer from the problems of irregularities on the electrodeposited surface, especially the problem of smoothness of the surface which varies greatly due to microvariation of the thickness of the organic composite silicate film and smooth electrodeposited film cannot be obtained.

As mentioned above, the conventionally proposed techniques are all insufficient to meet the present quality requirements for organic multicoated steel sheets, especially in adhesiveness of the electrodeposited film in wet and corrosive condition and smoothness of the surface.

SUMMARY OF THE INVENTION

Thus, an object of this invention is to provide an organic thin film multicoated steel sheet which is excellent in electrodeposition properties (adhesiveness of deposited film and surface smoothness) and spot weldable and which meets the quality requirements for automobiles and household appliances.

Another object of this invention is to provide an organic thin film multicoated steel sheet which is small in change of quality due to change in film thickness when subjected to electrodeposition and is high in productivity.

The above-mentioned objects have been attained by providing an organic thin film multicoated steel sheet which comprises a zinc or zinc base alloy plated steel sheet and as a first layer provided on the surface of said steel sheet a sparely soluble chromate film of 1-30% in water soluble matter, 0.01-1.0 in $Cr^{6+}/Cr^{3+}$ ratio and 10-150 mg/m$^2$ in total chromium application amount on one surface and as a second layer provided on said first layer, a solid film having a thickness of 0.3-5 μm of a solvent type coating composition which comprises 5-40% of a hydrophilic polyamide resin of 50-1,000 in polymerization degree, 5-40% of silica fine particles of 1-100 mμ in average particle size, 1-20% of polyethylene wax of 1,000-10,000 in molecular weight and 30-90% of a urethanated epoxy ester resin as a binder resin, these percentages being based on the weight of non-volatile matters.

As mentioned above, this invention is characterized in a combination of a sparely soluble chromate film and a solid film comprising a solvent type organic high molecular resin comprising a mixture of a highly water-resistant epoxy resin, a hydrophilic polyamide resin and a particulate silica. This is based on the following findings discussed below. The hydrophilic polyamide resin is necessary for obtaining smoothness (gas pin-holes, craters and orange peel) of the electrodeposited film. The particulate silica is used in the combination, to prevent the adhesion and corrosion resistance from deteriorating; although the combination of the soft hydrophilic polyamide resin and the very hard particulate silica gives a good effect on lubricity of film, the electrodeposition property of the electrodeposited film is insufficient; and therefore epoxy resin binders of high resistance are necessary. In order to further enhance the water-resistant secondary adhesion of the electrodeposited film, the undercoat chromate film must be sparely soluble.

DETAILED DESCRIPTION OF THE INVENTION

As the plated steel sheets used in this invention, there may be used any of zinc electroplated steel sheets, zinc melt-plated steel sheets, zinc alloy (Zn-Ni, Zn-Fe) electroplated steel sheets, zinc alloy (Zn-Al, Zn-Mg, Zn-Fe) melt-plated steel sheets, aluminum melt-plated steel sheets and steel sheets plated with these metals in multilayer.

For sparely-solubilization of the chromate film formed as a first layer on the surface of the above plated steel sheets, it is essential to increase the $Cr^{3+}$ in the film. For this purpose, there may be employed a method of cathodic electrolysis in a chromate bath, a method of using coating type chromate with organic reducing agents such as sugars, e.g., starch, and alcohols. In this invention, any of these methods or combination of them may be employed. If necessary, colloidal silica (sol) may be incorporated therein.

The thus formed chromate film has a water-soluble matter (chromium elution rate) of 1-30%, preferably 3-15%. When it is less than 1%, the self-healing action of $Cr^{6+}$ is insufficient to cause reduction in corrosion resistance. When it is more than 30%, interfacial pH in cationic electrodeposition coating is lowered due to eluted chromium and traces of generation of hydrogen gas are apt to be left as gas pin-holes or orange peels which result in defects in appearance and smoothness and which further cause formation of rust starting therefrom.

The $Cr^{6+}/Cr^{3+}$ ratio of the sparely-soluble chromate is 0.01–1.0, preferably 0.03–0.5. When this ratio is less than 0.01, it is difficult to enhance corrosion resistance owing to the insufficient self-healing action of $Cr^{6+}$ (soluble chromium) when more than 1.0, the elution of chromium ($Cr^{6+}$) into the treating solution of the electrodeposition coating or pretreatments such as degreasing treatment with alkalis and phosphate treatment is increased and accumulated. This results in loss of proper balance of the bath of the treating solution and problems in electrodeposition coatability including the phosphate treatment property.

Furthermore, the coating amount of the sparely soluble chromate film is 10–150 mg/m$^2$, preferably 30–100 mg/m$^2$ in terms of amount of metallic chromium. When the amount of metallic chromium is less than 10 mg/m$^2$, satisfactory adhesion or corrosion resistance of electrodeposited film cannot be expected and when more than 150 mg/m$^2$, adhesion of the electrodeposited film and press workability and spot weldability of the sheets are deteriorated.

The conditions required for formation of an organic highly molecular resin film as a second layer or upper coat layer on the chromate film are as follows:

First, urethanated epoxy ester resins which are binder resins as non-volatile matter in the coating composition are selected from the group consisting of epoxy resins containing at least 50% by weight of phenol in the molecule, epoxy ester resins obtained by reacting said epoxy resins with dicarboxylic acids in the presence or absence of amine catalyst and urethanated epoxy ester resins obtained by reacting said epoxy ester resins with partially blocked isocyanate compounds. The number-average molecular weight of the binder resin is 300–100,000. Further, the binder resin is used in an amount of 30–90% by weight of non-volatile matter in the coating composition. When the number-average molecular weight is less than 300, adhesion and corrosion resistance are deteriorated. On the other hand, the upper limit of the molecular weight in order for dissolving the resin in the organic solvents and using it in coating compositions is 100,000. Further, within such range of the number-average molecular weight of the epoxy binder resins, when the amount is less than 30% by weight, adhesion of the electrodeposited film and workability of the sheets are deteriorated and when more than 90% by weight, function as a binder for coating compositions is reduced by half.

The hydrophilic polyamide resins used as a second resin component together with said binder resins constitute the most important skeleton of this invention and are characterized by many acid amide bonds, high hydrophilicity and hygroscopicity, high polymerization degree and markedly high molecular weight. These hydrophilic polyamide resins include Nylon-6, Nylon-66 and copolymers of these Nylons with other Nylons; polyether polyol-, polyester ol-, polybutadiene polyol-modified Nylons, aromatic polyamides such as polymetaphenyleneisophthalamide, polyparaphenyleneterephthalamide, etc. The inventors have found that when such hydrophilic polyamide resins are contained in organic multicoated films, an electrodeposition solution penetrates into films at electrodeposition of the coating to cause reduction of the electric resistance of the films, resulting in remarkable improvements in electrodeposition coatability and appearance of electrodeposited films (prevention of gas pin-holes, orange peels, etc.). This is one of the important bases of this invention. The high molecular weight of the polyamide resins is effective for the prevention of swelling an dissolution of resins of organic multicoated films at pretreatments in electrodeposition coating, especially degreasing with alkalis or at the electrodeposition coating per se.

The polymerization degree of the hydrophilic polyamide resins is 50–1,000, preferably 50–500. When the polymerization degree is less than 50, the films are dissolved at the degreasing with alkalis or at the electrodeposition to cause failure in obtaining uniform appearance and reduction of acid resistance. When more than 1,000, the resin is too high in molecules, which is unsuitable in order to accomplish the object of this invention.

Use of the polyamide resin is also desirable for imparting flexibility and high workability to the films.

The amount of the polyamide resin to be incorporated is 5–40% by weight, preferably 5–25% by weight of non-volatile matter in the coating composition. When less than 5% by weight, improvement in uniform electrodeposition coatability (gas pin-holes and orange peels) cannot be expected so much and when more than 40% by weight, adhesion of the electrodeposited film decreases.

Next, in this invention a particulate silica of 1–100 m$\mu$ in average particle size is used in an amount of 5–40% by weight of non-volatile matter in the coating composition for improvement of corrosion resistance. When the particle size of the silica particle as a primary particle size is less than 1 m$\mu$, alkali resistance of the multicoated films decreases and when more than 100 m$\mu$, there is no effect of improvement of corrosion resistance and smoothness of electrodeposited film is also deteriorated. Therefore, the average particle size of the silica particle must be within the range of 1–100 m$\mu$, especially preferred is 5–50 m$\mu$. This silica particle includes, for example, fumed silica, colloidal silica, etc. and fumed silica is especially preferred. Colloidal silica contains ammonium ion or alkali metal ion for stabilization of colloid, which is apt to reduce corrosion resisting ability of films. The amount of the silica particle is 5–40% by weight, preferably 10–20% by weight of non-volatile matter in coating composition. When less than 5% by weight, the silica particle has no effect in improving corrosion resistance and when more than 40% by weight, workability decreases and this is insufficient to achieve the object of this invention.

As explained above, the organic multicoated films of this invention contain, as non-volatile matters, an epoxy binder resin, a hydrophilic polyamide resin and a particulate silica in specific amounts, respectively. Combination of these three components synergistically improves electrodeposition coatability and can provide films high in corrosion resistance, workability, adhesion and smoothness and capable of being spot welded.

Furthermore, it is preferred to further improve workability by adding to the coating composition of this invention lubricants such as polyolefins, carboxylic acid esters, metal salts of carboxylic acids, polyalkylene glycols, etc. or lubricant powders such as molybdenum disulfide, silicon compounds, fluorine compounds, etc. in an amount of 1–20% by weight, preferably 1–10% by weight of non-volatile components in coating composition. An especially preferred lubricant is polyethylene wax having a molecular weight of 1,000-10,000. The upper limit of the addition amount of the lubricants is 20% by weight and when the amount exceeds this upper limit, adhesion of electrodeposited film decreases.

In order to impart low-temperature back property to the coating composition of this invention, it is possible to add hardeners such as melamine resin, resol-type phenolic resin, polyisocyanate, etc. at a ratio hardener-/epoxy resin=0.1/9.9-4/6 (in solid matter weight ratio) and to harden the composition with heat. Especially preferred resol-type phenolic resins are those represented by the following formula:

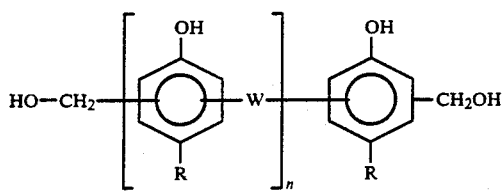

[wherein n is 0-4; W is —$CH_2$— or —$CH_2$—O—$CH_2$—; R is $CH_3$, H or —$C(CH_3)_2OH$].

The organic multicoating composition of this invention may be coated on the plated steel sheets by any of roll coating methods, spraying method, shower coating method, etc. Baking temperature may be 100°-250° C. Dry film thickness is 0.3-5 μm, preferably 0.5-3 μm and when less than 0.3 μm, corrosion resistance and press lubricity decrease and when more than 5 μm, stable spot weldability cannot be expected.

EXAMPLES

This invention is explained by the following examples wherein "part" and "%" are by weight unless otherwise notified.

Low carbon steel sheets of 0.8 mm thick and 1,000 mm wide were plated with zinc or zinc alloys as shown in Table 1. On the surface of the thus plated steel sheets was formed as a first layer a chromate film by cathodic electrolysis method and/or coating method using a chromate treating solution containing 3-10 g/l of $Cr^3$ reduced with an alcohol and at a bath temperature of 45° C. and a current density of 15 A/$dm^2$ in the case of the cathodic electrolysis method. Then, on the surface of the thus formed first layer was roll coated as a second layer a solvent type organic coating composition as shown in Table 1 at a thickness of 0.3-5 μm as a solid film. The thus coated sheets were baked at a final sheet temperature of 150° C. and dried by water cooling.

The results are shown in Example Nos. 1-65 for this invention and in Nos. 66-89 for comparative examples. In Example Nos. 1-7, $Cr^{6+}/Cr^{3+}$ ratio in the first chromate films, in Example Nos. 8-13, effectiveness of water soluble matter and in Example Nos. 14-19, effectiveness of chromate coating amount are shown in comparison with Comparative Example Nos. 66-71.

Example Nos. 20-53 show the effect of composition of the second organic film. Example Nos. 20-27 show the effects of proper molecular weight and addition amount of binder resins in comparison with Comparative Example Nos. 72-75. Example Nos. 28-35 show effects of proper polymerization degree and amount of hydrophilic resins in comparison with Comparative Example Nos. 76-79. Example Nos. 36-45 show the effects of proper particle size and amount of humed silica which is for improvement of corrosion resistance in comparison with Comparative Example Nos. 80-83.

Example Nos. 46-53 show the effect of lubricant in comparison with Comparative Example Nos. 84-87. Further, Example Nos. 54-59 show the effect of thickness of the second organic layer in comparison with Comparative Example Nos. 88-89. Use of various platings is shown in Example Nos. 60-65.

As explained above, the organic film multicoated steel sheet of this invention especially aims at improvement of cationic electrodeposition coatability and affinity of film surface to water is synergistically improved by providing a sparely soluble chromate film as a lower layer and adding a hydrophilic polyamide resin to a film coated on said lower layer as an upper layer. That is, the organic film multicoated steel sheet of this invention has superior cationic electrodeposition coatability, lubricity, press workability, adhesion and corrosion resistance and besides can undergo spot welding. Furthermore, the especially excellent characteristics of steel sheet coated with the present coating composition are conspicuously superior smoothness, uniformity and adhesion of electrodeposited film. Therefore, the organic multicoated steel sheet of this invention is excellent in cationic electrodeposition coatability and can meet quality requirements of high level in various industrial fields such as car industry, household appliance industry, etc. and extremely useful as coated steel sheets for cars.

TABLE 1

| | | Plated steel sheet | | Chromate film*1 (First layer) | | |
|---|---|---|---|---|---|---|
| | No. | Kind of plating | Amount of plating g/$m^2$ | Coating amount mg/$m^2$ | $Cr^{6+}/Cr^{3+}$ | Water soluble matter (%) |
| This invention | 1 | Electroplating of Zn—Ni (Ni 11%) | 20 | 50 | 0.01 | 10 |
| This invention | 2 | Electroplating of Zn—Ni (Ni 11%) | " | " | 0.03 | " |
| This invention | 3 | Electroplating of Zn—Ni (Ni 11%) | " | " | 0.05 | " |
| This invention | 4 | Electroplating of Zn—Ni (Ni 11%) | " | " | 0.1 | " |
| This invention | 5 | Electroplating of Zn—Ni (Ni 11%) | " | " | 0.3 | " |
| This invention | 6 | Electroplating of Zn—Ni (Ni 11%) | " | " | 0.5 | " |
| This | 7 | Electroplating | " | " | 1.0 | " |

TABLE 1-continued

| | | | | | | |
|---|---|---|---|---|---|---|
| invention | | of Zn—Ni (Ni 11%) | | | | |
| This invention | 8 | Electroplating of Zn—Ni (Ni 11%) | " | " | 0.1 | 1 |
| This invention | 9 | Electroplating of Zn—Ni (Ni 11%) | " | " | " | 3 |
| This invention | 10 | Electroplating of Zn—Ni (Ni 11%) | " | " | " | 5 |
| This invention | 11 | Electroplating of Zn—Ni (Ni 11%) | " | " | " | 15 |
| This invention | 12 | Electroplating of Zn—Ni (Ni 11%) | " | " | " | 20 |
| This invention | 13 | Electroplating of Zn—Ni (Ni 11%) | " | " | " | 30 |
| This invention | 14 | Electroplating of Zn—Ni (Ni 11%) | " | 10 | " | 10 |
| This invention | 15 | Electroplating of Zn—Ni (Ni 11%) | " | 30 | " | " |
| This invention | 16 | Electroplating of Zn—Ni (Ni 11%) | " | 70 | " | " |
| This invention | 17 | Electroplating of Zn—Ni (Ni 11%) | " | 100 | " | " |
| This invention | 18 | Electroplating of Zn—Ni (Ni 11%) | " | 120 | " | " |
| This invention | 19 | Electroplating of Zn—Ni (Ni 11%) | " | 150 | " | " |
| This invention | 20 | Electroplating of Zn—Ni (Ni 11%) | " | 50 | " | " |
| This invention | 21 | Electroplating of Zn—Ni (Ni 11%) | " | " | " | " |
| This invention | 22 | Electroplating of Zn—Ni (Ni 11%) | " | " | " | " |
| This invention | 23 | Electroplating of Zn—Ni (Ni 11%) | " | " | " | " |
| This invention | 24 | Electroplating of Zn—Ni (Ni 11%) | " | " | " | " |
| This invention | 25 | Electroplating of Zn—Ni (Ni 11%) | " | " | " | " |
| This invention | 26 | Electroplating of Zn—Ni (Ni 11%) | " | " | " | " |
| This invention | 27 | Electroplating of Zn—Ni (Ni 11%) | " | " | " | " |
| This invention | 28 | Electroplating of Zn—Ni (Ni 11%) | " | " | " | " |
| This invention | 29 | Electroplating of Zn—Ni (Ni 11%) | " | " | " | " |
| This invention | 30 | Electroplating of Zn—Ni (Ni 11%) | " | " | " | " |
| This invention | 31 | Electroplating of Zn—Ni (Ni 11%) | " | " | " | " |
| This invention | 32 | Electroplating of Zn—Ni (Ni 11%) | " | " | " | " |
| This invention | 33 | Electroplating of Zn—Ni (Ni 11%) | " | " | " | " |
| This invention | 34 | Electroplating of Zn—Ni | " | " | " | " |

TABLE 1-continued

| | | | | | | |
|---|---|---|---|---|---|---|
| This invention | 35 | Electroplating of Zn—Ni (Ni 11%) | " | " | " | " |
| This invention | 36 | Electroplating of Zn—Ni (Ni 11%) | " | " | " | " |
| This invention | 37 | Electroplating of Zn—Ni (Ni 11%) | " | " | " | " |
| This invention | 38 | Electroplating of Zn—Ni (Ni 11%) | " | " | " | " |
| This invention | 39 | Electroplating of Zn—Ni (Ni 11%) | " | " | " | " |
| This invention | 40 | Electroplating of Zn—Ni (Ni 11%) | " | " | " | " |
| This invention | 41 | Electroplating of Zn—Ni (Ni 11%) | " | " | " | " |
| This invention | 42 | Electroplating of Zn—Ni (Ni 11%) | " | " | " | " |
| This invention | 43 | Electroplating of Zn—Ni (Ni 11%) | " | " | " | " |
| This invention | 44 | Electroplating of Zn—Ni (Ni 11%) | " | " | " | " |
| This invention | 45 | Electroplating of Zn—Ni (Ni 11%) | " | " | " | " |
| This invention | 46 | Electroplating of Zn—Ni (Ni 11%) | " | " | " | " |
| This invention | 47 | Electroplating of Zn—Ni (Ni 11%) | " | " | " | " |
| This invention | 48 | Electroplating of Zn—Ni (Ni 11%) | " | " | " | " |
| This invention | 49 | Electroplating of Zn—Ni (Ni 11%) | " | " | " | " |
| This invention | 50 | Electroplating of Zn—Ni (Ni 11%) | " | " | " | " |
| This invention | 51 | Electroplating of Zn—Ni (Ni 11%) | " | " | " | " |
| This invention | 52 | Electroplating of Zn—Ni (Ni 11%) | " | " | " | " |
| This invention | 53 | Electroplating of Zn—Ni (Ni 11%) | " | " | " | " |
| This invention | 54 | Electroplating of Zn—Ni (Ni 11%) | " | " | " | " |
| This invention | 55 | Electroplating of Zn—Ni (Ni 11%) | " | " | " | " |
| This invention | 56 | Electroplating of Zn—Ni (Ni 11%) | " | " | " | " |
| This invention | 57 | Electroplating of Zn—Ni (Ni 11%) | " | " | " | " |
| This invention | 58 | Electroplating of Zn—Ni (Ni 11%) | " | " | " | " |
| This invention | 59 | Electroplating of Zn—Ni (Ni 11%) | " | " | " | " |
| This invention | 60 | Electroplating of Zn | " | " | " | " |
| This invention | 61 | Electroplating of Zn—Fe (Fe 80%) | " | " | " | " |
| This | 62 | Melt-plating | 100 | " | " | " |

TABLE 1-continued

| | | | | | | |
|---|---|---|---|---|---|---|
| invention | | of Zn | | | | |
| This invention | 63 | Melt-plating of Zn—Fe alloy | 45 | " | " | " |
| This invention | 64 | Melt-plating of Zn—Al (Al 5%) | 100 | " | " | " |
| This invention | 65 | Melt-plating of Al | 100 | " | " | " |
| Comparative Example | 66 | Electroplating of Zn—Ni (Ni 11%) | 20 | 5 | 0.1 | 10 |
| Comparative Example | 67 | Electroplating of Zn—Ni (Ni 11%) | " | 180 | " | " |
| Comparative Example | 68 | Electroplating of Zn—Ni (Ni 11%) | " | 50 | 0.008 | " |
| Comparative Example | 69 | Electroplating of Zn—Ni (Ni 11%) | " | " | 1.2 | " |
| Comparative Example | 70 | Electroplating of Zn—Ni (Ni 11%) | " | " | 0.1 | 0.5 |
| Comparative Example | 71 | Electroplating of Zn—Ni (Ni 11%) | " | " | " | 35 |
| Comparative Example | 72 | Electroplating of Zn—Ni (Ni 11%) | " | " | " | 10 |
| Comparative Example | 73 | Electroplating of Zn—Ni (Ni 11%) | " | " | " | " |
| Comparative Example | 74 | Electroplating of Zn—Ni (Ni 11%) | " | " | " | " |
| Comparative Example | 75 | Electroplating of Zn—Ni (Ni 11%) | " | " | " | " |
| Comparative Example | 76 | Electroplating of Zn—Ni (Ni 11%) | " | " | " | " |
| Comparative Example | 77 | Electroplating of Zn—Ni (Ni 11%) | " | " | " | " |
| Comparative Example | 78 | Electroplating of Zn—Ni (Ni 11%) | " | " | " | " |
| Comparative Example | 79 | Electroplating of Zn—Ni (Ni 11%) | " | " | " | " |
| Comparative Example | 80 | Electroplating of Zn—Ni (Ni 11%) | " | " | " | " |
| Comparative Example | 81 | Electroplating of Zn—Ni (Ni 11%) | " | " | " | " |
| Comparative Example | 82 | Electroplating of Zn—Ni (Ni 11%) | " | " | " | " |
| Comparative Example | 83 | Electroplating of Zn—Ni (Ni 11%) | " | " | " | " |
| Comparative Example | 84 | Electroplating of Zn—Ni (Ni 11%) | " | " | " | " |
| Comparative Example | 85 | Electroplating of Zn—Ni (Ni 11%) | " | " | " | " |
| Comparative Example | 86 | Electroplating of Zn—Ni (Ni 11%) | " | " | " | " |
| Comparative Example | 87 | Electroplating of Zn—Ni (Ni 11%) | " | " | " | " |
| Comparative Example | 88 | Electroplating of Zn—Ni (Ni 11%) | " | " | " | " |
| Comparative Example | 89 | Electroplating of Zn—Ni (Ni 11%) | " | " | " | " |

Organic film (second layer)

TABLE 1-continued

|  | No. | Binder*2 resin Number-average molecular weight | Binder*2 resin Amount wt % | Hydrophilic*3 resin Polymerization degree | Hydrophilic*3 resin Amount wt % | Fumed*4 silica Average particle size (mμ) | Fumed*4 silica Amount wt % | Polyethylene*5 wax Molecular weight | Polyethylene*5 wax Amount wt % | Thickness*6 of film (μm) |
|---|---|---|---|---|---|---|---|---|---|---|
| This invention | 1 | $1 \times 10^4$ | 60 | 300 | 20 | 8 | 15 | $3 \times 10^3$ | 5 | 1.5 |
| This invention | 2 | " | " | " | " | " | " | " | " | " |
| This invention | 3 | " | " | " | " | " | " | " | " | " |
| This invention | 4 | " | " | " | " | " | " | " | " | " |
| This invention | 5 | " | " | " | " | " | " | " | " | " |
| This invention | 6 | " | " | " | " | " | " | " | " | " |
| This invention | 7 | " | " | " | " | " | " | " | " | " |
| This invention | 8 | " | " | " | " | " | " | " | " | " |
| This invention | 9 | " | " | " | " | " | " | " | " | " |
| This invention | 10 | " | " | " | " | " | " | " | " | " |
| This invention | 11 | " | " | " | " | " | " | " | " | " |
| This invention | 12 | " | " | " | " | " | " | " | " | " |
| This invention | 13 | " | " | " | " | " | " | " | " | " |
| This invention | 14 | " | " | " | " | " | " | " | " | " |
| This invention | 15 | " | " | " | " | " | " | " | " | " |
| This invention | 16 | " | " | " | " | " | " | " | " | " |
| This invention | 17 | " | " | " | " | " | " | " | " | " |
| This invention | 18 | " | " | " | " | " | " | " | " | " |
| This invention | 19 | " | " | " | " | " | " | " | " | " |
| This invention | 20 | $3 \times 10^2$ | " | " | " | " | " | " | " | " |
| This invention | 21 | $3 \times 10^3$ | " | " | " | " | " | " | " | " |
| This invention | 22 | $3 \times 10^4$ | " | " | " | " | " | " | " | " |
| This invention | 23 | $10 \times 10^4$ | " | " | " | " | " | " | " | " |
| This invention | 24 | $1 \times 10^4$ | 30 | " | " | " | " | " | " | " |
| This invention | 25 | " | 40 | " | " | " | " | " | " | " |
| This invention | 26 | " | 80 | " | " | " | " | " | " | " |
| This invention | 27 | " | 90 | " | " | " | " | " | " | " |
| This invention | 28 | " | 60 | 50 | " | " | " | " | " | " |
| This invention | 29 | " | " | 100 | " | " | " | " | " | " |
| This invention | 30 | " | " | 500 | " | " | " | " | " | " |
| This invention | 31 | " | " | 1000 | " | " | " | " | " | " |
| This invention | 32 | " | " | 300 | 5 | " | " | " | " | " |
| This invention | 33 | " | " | " | 10 | " | " | " | " | " |
| This invention | 34 | " | " | " | 25 | " | " | " | " | " |
| This invention | 35 | " | " | " | 40 | " | " | " | " | " |
| This invention | 36 | " | " | " | 20 | 1 | " | " | " | " |
| This invention | 37 | " | " | " | " | 5 | " | " | " | " |
| This invention | 38 | " | " | " | " | 10 | " | " | " | " |

TABLE 1-continued

| | No. | | | | | | | | | |
|---|---|---|---|---|---|---|---|---|---|---|
| This invention | 39 | " | " | " | " | 50 | " | " | " | " |
| This invention | 40 | " | " | " | " | 100 | " | " | " | " |
| This invention | 41 | " | " | " | " | 8 | 5 | " | " | " |
| This invention | 42 | " | " | " | " | " | 10 | " | " | " |
| This invention | 43 | " | " | " | " | " | 15 | " | " | " |
| This invention | 44 | " | " | " | " | " | 20 | " | " | " |
| This invention | 45 | " | " | " | " | " | 40 | " | " | " |
| This invention | 46 | " | " | " | " | " | 15 | $1 \times 10^3$ | " | " |
| This invention | 47 | " | " | " | " | " | " | $5 \times 10^3$ | " | " |
| This invention | 48 | " | " | " | " | " | " | $1 \times 10^4$ | " | " |
| This invention | 49 | " | " | " | " | " | " | $3 \times 10^3$ | 1 | " |
| This invention | 50 | " | " | " | " | " | " | " | 3 | " |
| This invention | 51 | " | " | " | " | " | " | " | 7 | " |
| This invention | 52 | " | " | " | " | " | " | " | 10 | " |
| This invention | 53 | " | " | " | " | " | " | " | 20 | " |
| This invention | 54 | " | " | " | " | " | " | " | 5 | 0.3 |
| This invention | 55 | " | " | " | " | " | " | " | " | 0.5 |
| This invention | 56 | " | " | " | " | " | " | " | " | 1.0 |
| This invention | 57 | " | " | " | " | " | " | " | " | 2.0 |
| This invention | 58 | " | " | " | " | " | " | " | " | 3.0 |
| This invention | 59 | " | " | " | " | " | " | " | " | 5.0 |
| This invention | 60 | " | " | " | " | " | " | " | " | 1.5 |
| This invention | 61 | " | " | " | " | " | " | " | " | " |
| This invention | 62 | " | " | " | " | " | " | " | " | " |
| This invention | 63 | " | " | " | " | " | " | " | " | " |
| This invention | 64 | " | " | " | " | " | " | " | " | " |
| This invention | 65 | " | " | " | " | " | " | " | " | " |
| Comparative Example | 66 | " | " | " | " | " | " | " | " | " |
| Comparative Example | 67 | " | " | " | " | " | " | " | " | " |
| Comparative Example | 68 | " | " | " | " | " | " | " | " | " |
| Comparative Example | 69 | " | " | " | " | " | " | " | " | " |
| Comparative Example | 70 | " | " | " | " | " | " | " | " | " |
| Comparative Example | 71 | " | " | " | " | " | " | " | " | " |
| Comparative Example | 72 | $2 \times 10^2$ | " | " | " | " | " | " | " | " |
| Comparative Example | 73 | $11 \times 10^4$ | " | " | " | " | " | " | " | " |
| Comparative Example | 74 | $1 \times 10^4$ | 20 | " | " | " | " | " | " | " |

TABLE 1-continued

| | No. | | | | | | | | | | |
|---|---|---|---|---|---|---|---|---|---|---|---|
| Comparative Example | 75 | " | 95 | " | " | " | " | " | " | " | " |
| Comparative Example | 76 | " | 60 | 30 | " | " | " | " | " | " | " |
| Comparative Example | 77 | " | " | 1500 | " | " | " | " | " | " | " |
| Comparative Example | 78 | " | " | 300 | 3 | " | " | " | " | " | " |
| Comparative Example | 79 | " | " | " | 45 | " | " | " | " | " | " |
| Comparative Example | 80 | " | " | " | 20 | 0.5 | " | " | " | " | " |
| Comparative Example | 81 | " | " | " | " | 150 | " | " | " | " | " |
| Comparative Example | 82 | " | " | " | " | 8 | 3 | " | " | " | " |
| Comparative Example | 83 | " | " | " | " | " | 50 | " | " | " | " |
| Comparative Example | 84 | " | " | " | " | " | 15 | 500 | " | " | " |
| Comparative Example | 85 | " | " | " | " | " | " | $2 \times 10^4$ | " | " | " |
| Comparative Example | 86 | " | " | " | " | " | " | $3 \times 10^3$ | 0.5 | " | " |
| Comparative Example | 87 | " | " | " | " | " | " | " | 3.0 | " | " |
| Comparative Example | 88 | " | " | " | " | " | " | " | 5 | 0.2 | " |
| Comparative Example | 89 | " | " | " | " | " | " | " | " | 6.0 | " |

| | No. | Alkali*7 swelling resistance of film | Cationic electrodeposition (Power Top U100) | | | | | Press*10 workability | | Corrosion*11 resistance | Continuous*12 spot weldability |
|---|---|---|---|---|---|---|---|---|---|---|---|
| | | | Appearance*8 of electro-deposited film | | | Adhesion*9 of electro-deposited film | | | | | |
| | | | Gas pin-holes | Crater | Orange peel | Primary | Secondary | Galling | Powdering | | |
| This invention | 1 | ⊙ | ⊙ | ⊙ | ⊙ | ⊙ | ⊙ | ⊙ | ⊙ | ⊙ | ⊙ |
| This invention | 2 | ⊙ | ⊙ | ⊙ | ⊙ | ⊙ | ⊙ | ⊙ | ⊙ | ⊙ | ⊙ |
| This invention | 3 | ⊙ | ⊙ | ⊙ | ⊙ | ⊙ | ⊙ | ⊙ | ⊙ | ⊙ | ⊙ |
| This invention | 4 | ⊙ | ⊙ | ⊙ | ⊙ | ⊙ | ⊙ | ⊙ | ⊙ | ⊙ | ⊙ |
| This invention | 5 | ⊙ | ⊙ | ⊙ | ⊙ | ⊙ | ⊙ | ⊙ | ⊙ | ⊙ | ⊙ |
| This invention | 6 | ⊙ | ⊙ | ⊙ | ⊙ | ⊙ | ⊙ | ⊙ | ⊙ | ⊙ | ⊙ |
| This invention | 7 | ⊙ | ⊙ | ⊙ | ⊙ | ⊙ | ⊙ | ⊙ | ⊙ | ⊙ | ⊙ |
| This invention | 8 | ⊙ | ⊙ | ⊙ | ⊙ | ⊙ | ⊙ | ⊙ | ⊙ | ⊙ | ⊙ |
| This invention | 9 | ⊙ | ⊙ | ⊙ | ⊙ | ⊙ | ⊙ | ⊙ | ⊙ | ⊙ | ⊙ |
| This invention | 10 | ⊙ | ⊙ | ⊙ | ⊙ | ⊙ | ⊙ | ⊙ | ⊙ | ⊙ | ⊙ |
| This invention | 11 | ⊙ | ⊙ | ⊙ | ⊙ | ⊙ | ⊙ | ⊙ | ⊙ | ⊙ | ⊙ |
| This invention | 12 | ⊙ | ⊙ | ⊙ | ⊙ | ⊙ | ⊙ | ⊙ | ⊙ | ⊙ | ⊙ |
| This invention | 13 | ⊙ | ⊙ | ⊙ | ⊙ | ⊙ | ⊙ | ⊙ | ⊙ | ⊙ | ⊙ |
| This invention | 14 | ⊙ | ⊙ | ⊙ | ⊙ | ⊙ | ⊙ | ⊙ | ⊙ | ⊙ | ⊙ |

TABLE 1-continued

| | | | | | | | | | | | |
|---|---|---|---|---|---|---|---|---|---|---|---|
| This invention | 15 | ⊙ | ⊙ | ⊙ | ⊙ | ⊙ | ⊙ | ⊙ | ⊙ | ⊙ | ⊙ |
| This invention | 16 | ⊙ | ⊙ | ⊙ | ⊙ | ⊙ | ⊙ | ⊙ | ⊙ | ⊙ | ⊙ |
| This invention | 17 | ⊙ | ⊙ | ⊙ | ⊙ | ⊙ | ⊙ | ⊙ | ⊙ | ⊙ | ⊙ |
| This invention | 18 | ⊙ | ⊙ | ⊙ | ⊙ | ⊙ | ⊙ | ⊙ | ⊙ | ⊙ | ⊙ |
| This invention | 19 | ⊙ | ⊙ | ⊙ | ⊙ | ⊙ | ⊙ | ⊙ | ⊙ | ⊙ | ⊙ |
| This invention | 20 | ⊙ | ⊙ | ⊙ | ⊙ | ⊙ | ⊙ | ⊙ | ⊙ | ⊙ | ⊙ |
| This invention | 21 | ⊙ | ⊙ | ⊙ | ⊙ | ⊙ | ⊙ | ⊙ | ⊙ | ⊙ | ⊙ |
| This invention | 22 | ⊙ | ⊙ | ⊙ | ⊙ | ⊙ | ⊙ | ⊙ | ⊙ | ⊙ | ⊙ |
| This invention | 23 | ⊙ | ⊙ | ⊙ | ⊙ | ⊙ | ⊙ | ⊙ | ⊙ | ⊙ | ⊙ |
| This invention | 24 | ⊙ | ⊙ | ⊙ | ⊙ | ⊙ | ⊙ | ⊙ | ⊙ | ⊙ | ⊙ |
| This invention | 25 | ⊙ | ⊙ | ⊙ | ⊙ | ⊙ | ⊙ | ⊙ | ⊙ | ⊙ | ⊙ |
| This invention | 26 | ⊙ | ⊙ | ⊙ | ⊙ | ⊙ | ⊙ | ⊙ | ⊙ | ⊙ | ⊙ |
| This invention | 27 | ⊙ | ⊙ | ⊙ | ⊙ | ⊙ | ⊙ | ⊙ | ⊙ | ⊙ | ⊙ |
| This invention | 28 | ⊙ | ⊙ | ⊙ | ⊙ | ⊙ | ⊙ | ⊙ | ⊙ | ⊙ | ⊙ |
| This invention | 29 | ⊙ | ⊙ | ⊙ | ⊙ | ⊙ | ⊙ | ⊙ | ⊙ | ⊙ | ⊙ |
| This invention | 30 | ⊙ | ⊙ | ⊙ | ⊙ | ⊙ | ⊙ | ⊙ | ⊙ | ⊙ | ⊙ |
| This invention | 31 | ⊙ | ⊙ | ⊙ | ⊙ | ⊙ | ⊙ | ⊙ | ⊙ | ⊙ | ⊙ |
| This invention | 32 | ⊙ | ⊙ | ⊙ | ⊙ | ⊙ | ⊙ | ⊙ | ⊙ | ⊙ | ⊙ |
| This invention | 33 | ⊙ | ⊙ | ⊙ | ⊙ | ⊙ | ⊙ | ⊙ | ⊙ | ⊙ | ⊙ |
| This invention | 34 | ⊙ | ⊙ | ⊙ | ⊙ | ⊙ | ⊙ | ⊙ | ⊙ | ⊙ | ⊙ |
| This invention | 35 | ⊙ | ⊙ | ⊙ | ⊙ | ⊙ | ⊙ | ⊙ | ⊙ | ⊙ | ⊙ |
| This invention | 36 | ⊙ | ⊙ | ⊙ | ⊙ | ⊙ | ⊙ | ⊙ | ⊙ | ⊙ | ⊙ |
| This invention | 37 | ⊙ | ⊙ | ⊙ | ⊙ | ⊙ | ⊙ | ⊙ | ⊙ | ⊙ | ⊙ |
| This invention | 38 | ⊙ | ⊙ | ⊙ | ⊙ | ⊙ | ⊙ | ⊙ | ⊙ | ⊙ | ⊙ |
| This invention | 39 | ⊙ | ⊙ | ⊙ | ⊙ | ⊙ | ⊙ | ⊙ | ⊙ | ⊙ | ⊙ |
| This invention | 40 | ⊙ | ⊙ | ⊙ | ⊙ | ⊙ | ⊙ | ⊙ | ⊙ | ⊙ | ⊙ |
| This invention | 41 | ⊙ | ⊙ | ⊙ | ⊙ | ⊙ | ⊙ | ⊙ | ⊙ | ⊙ | ⊙ |
| This invention | 42 | ⊙ | ⊙ | ⊙ | ⊙ | ⊙ | ⊙ | ⊙ | ⊙ | ⊙ | ⊙ |
| This invention | 43 | ⊙ | ⊙ | ⊙ | ⊙ | ⊙ | ⊙ | ⊙ | ⊙ | ⊙ | ⊙ |
| This invention | 44 | ⊙ | ⊙ | ⊙ | ⊙ | ⊙ | ⊙ | ⊙ | ⊙ | ⊙ | ⊙ |
| This invention | 45 | ⊙ | ⊙ | ⊙ | ⊙ | ⊙ | ⊙ | ⊙ | ⊙ | ⊙ | ⊙ |
| This invention | 46 | ⊙ | ⊙ | ⊙ | ⊙ | ⊙ | ⊙ | ⊙ | ⊙ | ⊙ | ⊙ |
| This invention | 47 | ⊙ | ⊙ | ⊙ | ⊙ | ⊙ | ⊙ | ⊙ | ⊙ | ⊙ | ⊙ |
| This invention | 48 | ⊙ | ⊙ | ⊙ | ⊙ | ⊙ | ⊙ | ⊙ | ⊙ | ⊙ | ⊙ |
| This invention | 49 | ⊙ | ⊙ | ⊙ | ⊙ | ⊙ | ⊙ | ⊙ | ⊙ | ⊙ | ⊙ |
| This invention | 50 | ⊙ | ⊙ | ⊙ | ⊙ | ⊙ | ⊙ | ⊙ | ⊙ | ⊙ | ⊙ |
| This invention | 51 | ⊙ | ⊙ | ⊙ | ⊙ | ⊙ | ⊙ | ⊙ | ⊙ | ⊙ | ⊙ |
| This invention | 52 | ⊙ | ⊙ | ⊙ | ⊙ | ⊙ | ⊙ | ⊙ | ⊙ | ⊙ | ⊙ |
| This invention | 53 | ⊙ | ⊙ | ⊙ | ⊙ | ⊙ | ⊙ | ⊙ | ⊙ | ⊙ | ⊙ |
| This invention | 54 | ⊙ | ⊙ | ⊙ | ⊙ | ⊙ | ⊙ | ⊙ | ⊙ | ⊙ | ⊙ |
| This invention | 55 | ⊙ | ⊙ | ⊙ | ⊙ | ⊙ | ⊙ | ⊙ | ⊙ | ⊙ | ⊙ |

TABLE 1-continued

| | | | | | | | | | | | |
|---|---|---|---|---|---|---|---|---|---|---|---|
| This invention | 56 | ⊙ | ⊙ | ⊙ | ⊙ | ⊙ | ⊙ | ⊙ | ⊙ | ⊙ | ⊙ |
| This invention | 57 | ⊙ | ⊙ | ⊙ | ⊙ | ⊙ | ⊙ | ⊙ | ⊙ | ⊙ | ⊙ |
| This invention | 58 | ⊙ | ⊙ | ⊙ | ⊙ | ⊙ | ⊙ | ⊙ | ⊙ | ⊙ | ⊙ |
| This invention | 59 | ⊙ | ⊙ | ⊙ | ⊙ | ⊙ | ⊙ | ⊙ | ⊙ | ⊙ | ⊙ |
| This invention | 60 | ⊙ | ⊙ | ⊙ | ⊙ | ⊙ | ⊙ | ⊙ | ⊙ | ⊙ | ⊙ |
| This invention | 61 | ⊙ | ⊙ | ⊙ | ⊙ | ⊙ | ⊙ | ⊙ | ⊙ | ⊙ | ⊙ |
| This invention | 62 | ⊙ | ⊙ | ⊙ | ⊙ | ⊙ | ⊙ | ⊙ | ⊙ | ⊙ | ⊙ |
| This invention | 63 | ⊙ | ⊙ | ⊙ | ⊙ | ⊙ | ⊙ | ⊙ | ⊙ | ⊙ | ⊙ |
| This invention | 64 | ⊙ | ⊙ | ⊙ | ⊙ | ⊙ | ⊙ | ⊙ | ⊙ | ⊙ | ⊙ |
| This invention | 65 | ⊙ | ⊙ | ⊙ | ⊙ | ⊙ | ⊙ | ⊙ | ⊙ | ⊙ | ⊙ |
| Comparative Example | 66 | ⊙ | ⊙ | ⊙ | ⊙ | ○ | ○~Δ | ○ | ○~Δ | Δ | ⊙ |
| Comparative Example | 67 | ⊙ | ○~Δ | ○~Δ | ⊙ | ○ | ○~Δ | ○ | Δ | ⊙ | ○~Δ |
| Comparative Example | 68 | ⊙ | ⊙ | ⊙ | ⊙ | ⊙ | ⊙ | ⊙ | ⊙ | Δ | ⊙ |
| Comparative Example | 69 | ⊙ | Δ | Δ | ○ | ⊙~○ | ○~Δ | ⊙ | ⊙ | ⊙ | ⊙ |
| Comparative Example | 70 | ⊙ | ⊙ | ⊙ | ⊙ | ⊙ | ⊙ | ⊙ | ⊙ | Δ~X | ⊙ |
| Comparative Example | 71 | ⊙ | Δ~X | Δ~X | ○ | ⊙ | ○~Δ | ⊙ | ⊙ | ⊙ | ⊙ |
| Comparative Example | 72 | Δ~X | ⊙ | ⊙ | Δ~X | ⊙ | ○ | ⊙ | ⊙ | Δ | ⊙ |
| Comparative Example | 73 | (Unsuitable as coating composition) | | | | | | | | | |
| Comparative Example | 74 | ⊙ | ⊙ | ⊙ | ⊙ | Δ | Δ~X | ○ | Δ | ○ | ⊙ |
| Comparative Example | 75 | (Unsuitable as coating composition) | | | | | | | | | |
| Comparative Example | 76 | X | ⊙ | ⊙ | X | ○ | Δ~X | Δ | Δ~X | | ⊙ |
| Comparative Example | 77 | (Unsuitable as coating composition) | | | | | | | | | |
| Comparative Example | 78 | ⊙ | X | X | X | ⊙ | ⊙ | ⊙ | ⊙ | ⊙ | ⊙ |
| Comparative Example | 79 | ⊙ | ⊙ | ⊙ | ⊙ | Δ | Δ~X | ⊙ | ⊙ | ⊙ | ⊙ |
| Comparative Example | 80 | ⊙ | ○ | ○ | ○ | ⊙ | ⊙ | ⊙ | ⊙ | X | ⊙ |
| Comparative Example | 81 | ⊙ | ○ | ○ | Δ | ⊙ | ⊙ | ○ | ○ | Δ~X | ⊙ |
| Comparative Example | 82 | ⊙ | ⊙ | ⊙ | ⊙ | ⊙ | ⊙ | ⊙ | ⊙ | X | ⊙ |
| Comparative Example | 83 | ⊙ | ⊙ | ⊙ | ⊙ | ⊙ | ⊙ | Δ | Δ~X | ⊙ | ⊙ |
| Comparative Example | 84 | ⊙ | ⊙ | ⊙ | ⊙ | ⊙ | ⊙ | ○ | ○ | ○ | ⊙ |
| Comparative Example | 85 | ⊙ | ⊙ | ⊙ | ⊙ | ⊙ | ⊙ | ○~Δ | ○~Δ | ○ | ⊙ |
| Comparative Example | 86 | ⊙ | ⊙ | ⊙ | ⊙ | ⊙ | ⊙ | X | X | Δ | ⊙ |

TABLE 1-continued

| Example | | | | | | | | | | | |
|---|---|---|---|---|---|---|---|---|---|---|---|
| Comparative Example | 87 | ⊙ | ⊙ | ⊙ | ⊙ | ○ | △ | ⊙ | ⊙ | ⊙ | ⊙ |
| Comparative Example | 88 | ⊙ | ⊙ | ⊙ | ⊙ | ⊙ | ⊙ | △ | △~X | X | ⊙ |
| Comparative Example | 89 | ⊙ | ⊙ | ⊙ | ⊙ | ⊙ | ⊙ | ⊙ | ⊙ | ⊙ | X |

Notes
*1 Ratio of amount of chromium eluted after dipping a sample in boiling water for 5 minutes and initial application amount of chromium on the same sample was taken as water soluble matter (%). The application amount of chromium was in terms of metallic chromium.
*2 A mixture of urethanated epoxy ester resin (manufactured by Nippon Paint Co., Ltd.) and resol type phenolic resin (BKS-316/Showa Highpolymer Co., Ltd.) at 8:2.
*3 Polypropylene glycol modified Nylon 6 (manufactured by Toray Industries, Inc.).
*4 Aerosil 300 (Japan Silica Co., Ltd.).
*5 Ceridust 3620 (manufactured by Hoechst A.G.) of 2000 in molecular weight.
*6 Gravimetric thickness.
*7 Sample was dipped in alkali degreased 2% Ridolin 400 (manufactured by Nippon Paint Co., Ltd.) at 65° C. for 5 minutes.
⊙: No change.
○: Slightly whitening.
△: Partially whitening.
X: Partially peeling.
*8 Power Top U-100 (manufactured by Nippon Paint Co., Ltd.) was electrodeposited at a thickness of 20 μm and at 250 V and 28° C. for 3 minutes.
Gas pin-holes and craters
⊙: No gas pin-holes and craters occurred.
○: Several pin-holes and craters occurred.
△: Less than ten pin-holes and craters occurred.
X: More than ten pin-holes and craters occurred.
Orange peels
⊙: Smooth.
○: Slightly occurred.
△: Partially occurred.
X: Occurred on the whole surface.
*9 The sample was dipped in a warm water of 40° C. for 7 days and then subjected to cross-cut square peeling test with tape (this is called a secondary adhesion test).
2 mm square × 100
⊙: 100/100 (i.e., no squares were peeled.)
○: more than 95/100 (i.e., more than 95 squares remained.)
△: more than 90/100 (i.e., less than 95 and more than 90 squares remained.)
X: less than 90/100 (i.e., less than 90 squares remained.)
*10 A cylinder press of 80 mm in diameter × 50 mm in height without oil was used.
Galling
⊙: Not occurred.
○: Slightly occurred.
△: Partially occurred.
X: Wholly occurred.
Powdering observed by taping on worked portion
⊙: Not occurred.
○: Slightly occurred.
△: Partially occurred.
X: Wholly occurred.
(The worked portion was contacted with a metal mold in pressing.)
*11 Salt spray test for worked portion by cylinder press (80 mm in diameter × 50 mm in height) (JIS Z-2371)
⊙: Less than 1% of rust.
○: Less than 5% of rust.
△: Less than 10% of rust.
X: More than 10% of rust.
*12 Diameter of electrode tip: 6 mm in diameter/CF
Pressure: 200 kg.f
Current: 9 KA
Time: 10 cycles
Combination of two one-side-coated sheets (the uncoated surface of one sheet was faced to the coated surface of the other sheet.)
⊙: More than 5000 spots
○: More than 4000 spots
△: More than 3000 spots
X: Less than 2000 spots

What is claimed is:

1. An organic multicoated steel sheet susceptible to cationic electrodeposition coating which comprises a zinc or zinc alloy plated steel sheet and as a first layer provided on the surface of said plated steel sheet a chromate film of 1–30% in water soluble matter, 0.01–1.0 in $Cr^{6+}/Cr^{3+}$ ratio and 10–150 mg/m² in amount of chromium applied and, as a second layer provided on said first layer, a solid film having a thickness of 0.3–5 μm of an organic solvent coating composition having the following composition:
   (a) 30–90% of an urethanated epoxy ester resin having a number-average molecular weight of 300–100,000,
   (b) 5–40% of a hydrophilic polyamide resin having a polymerization degree of 50–1,000,
   (c) 5–40% of a silica particle of 1–100 mμ in average particle size and
   (d) 1–20% of a lubricant having a molecular weight of 1,000–10,000.

2. An organic multicoated steel sheet according to claim 1 wherein the urethanated epoxy ester resin is selected from the group consisting of epoxy resins containing at least 50% by weight of phenol, epoxy ester resins obtained by reacting said epoxy resin with a dicarboxylic acid in the presence or absence of a amine catalyst and urethanated epoxy ester resins obtained by reacting said epoxy ester resin with a partially blocked isocyanate compound.

3. An organic multicoated steel sheet according to claim 1 wherein the hydrophilic polyamide resin is selected from the group consisting of Nylon 6, Nylon 66, copolymers of these Nylons with other Nylons, polyether polyol-, polyester ol- and polybutadiene polyol-modified Nylons, polymetaphenyleneisophthalamide and polyparaphenyleneterephthalamide.

4. An organic multicoated steel sheet according to claim 1 wherein the silica particle is selected from the group consisting of fumed silica and colloidal silica.

5. An organic multicoated steel sheet according to claim 1 wherein the solvent coating composition additionally contains a hardener at a ratio of hardener-/epoxy resin=0.1/9.9–4/6 in solid weight ratio.

6. An organic multicoated steel sheet according to claim 1 wherein the lubricant is selected from the group of polyolefins, carboxylic acid esters, metal salts of carboxylic acids, polyalkylene glycols, molybdenum disulfide, silicon compounds, or fluorine compounds.

7. A method for making an organic multicoated steel sheet which comprises coating on a zinc or zinc alloy plated steel sheet as a first layer a chromate film of 1–30% in water soluble matter, 0.01–1.0 in $Cr^{6+}/Cr^{3+}$ ratio and 10–150 mg/m$^2$ in total chromium application amount on one surface and then coating as a second layer on said first layer a solid film having a thickness of 0.3–5 μm of a solvent type coating composition having the following composition based on the weight of non-volatile matter:
 (a) 30–90% of an urethanated epoxy ester resin having a number-average molecular weight of 300–100,000,
 (b) 5–40% of a hydrophilic polyamide resin having a polymerization degree of 50–1,000
 (c) 5–40% of a silica particle of 1–100 mμ in average particle size and
 (d) 1–20% of a lubricant having a molecular weight of 1,000–10,000.

8. An organic-coated steel sheet substrate comprising a zinc-, zinc alloy-, or aluminum-plated steel substrate, there being provided on at least a part of the surface of the plated steel substrate a first chromium-containing layer and a second layer of a composition comprising:
 (a) 30% to 90% by weight of an epoxy resin derivative having a number-average molecular weight of 300 to 100,000;
 (b) 5% to 40% by weight of a hydrophilic polyamide resin having a polymerization degree to 50 to 10,000; and
 (c) 5% to 40% by weight of silica particles of average particle size of 1 to 1,000 mμ.

9. An organic-coated steel substrate, as claimed in claim 8, wherein the second layer further comprises 1% to 20% by weight of a lubricant.

10. An organic-coated steel sheet substrate, as claimed in claim 8, wherein the lubricant is selected from polyolefins, carboxylic acid esters, metal salts of carboxylic acids, polyalkylene glycols, molybdenum disulfide, silicon compounds, fluorine compounds, and polyethylene wax having a molecular weight of 1,000 to 10,000.

* * * * *